(12) United States Patent
Bourgault

(10) Patent No.: US 7,594,627 B2
(45) Date of Patent: Sep. 29, 2009

(54) METHOD AND APPARATUS FOR DE-ICING AIRCRAFT AND OTHER SNOW OR ICE COVERED SURFACES

(75) Inventor: Pierre Bourgault, Ottawa (CA)

(73) Assignee: Chinook Mobile Heating and Deicing Corporation (CA)

( * ) Notice: Subject to any disclaimer, the term of this patent is extended or adjusted under 35 U.S.C. 154(b) by 567 days.

(21) Appl. No.: 11/135,245

(22) Filed: May 23, 2005

(65) Prior Publication Data

US 2006/0107910 A1    May 25, 2006

(30) Foreign Application Priority Data

Nov. 19, 2004    (CA) ................................. 2487890

(51) Int. Cl.
*B64D 15/00*    (2006.01)
(52) U.S. Cl. ............................. 244/134 C; 244/134 R; 37/199; 37/227; 37/228
(58) Field of Classification Search ............. 244/134 C, 244/134 R; 37/199, 227, 228
See application file for complete search history.

(56) References Cited

U.S. PATENT DOCUMENTS

| 136,853 | A | * | 3/1873 | Mullaly | ....................... 239/130 |
| 3,410,262 | A | * | 11/1968 | Qualls | .................. 126/271.2 R |
| 5,244,168 | A | * | 9/1993 | Williams | ................ 244/134 R |

* cited by examiner

*Primary Examiner*—J. Woodrow Eldred
(74) *Attorney, Agent, or Firm*—Thomas, Kayden, Horstemeyer & Risley, LLP.

(57) ABSTRACT

Methods and devices for deicing aircraft and other snow or ice covered surfaces. The invention is based on warm moisture-laden air or steam that can be released over the surface to be thawed. The device consists of three components: a hot water or steam boiler with an associated pump; a plenum for heating and humidifying air; and a delivery unit or head that brings the moisture-laden air or steam into contact with the surface to be de-iced or thawed. Various delivery heads are also described.

17 Claims, 17 Drawing Sheets

METHOD AND APPARATUS FOR DE-ICING AIRCRAFT AND OTHER SNOW OR ICE COVERED SURFACES

This invention claims the benefit of priority to Canadian Patent Application 2,487,890 filed Nov. 19, 2004.

FIELD OF THE INVENTION

This application relates to deicing and snow-melting devices and methods to carry out these practices, and in particular, the present invention relates to deicing ice or snow-covered surfaces such as aircraft, helicopter blades, walkways and driveways.

BACKGROUND OF THE INVENTION

One of the most common areas where deicing of frozen surfaces is required in northern climates is that of deicing aircraft and helicopter blades. The most common method of deicing these vehicles is by spraying wings, fuselage and blades with a hot glycol/water solution. The main function of the glycol spray is to melt the ice and the snow already there and to warm the surface in order to provide a brief period of protection against further icing.

Other hot liquid solutions, organic and inorganic, have been described in patents and have been shown to work but they all have major drawbacks and glycol remains the material of choice. Deicing a large aircraft can cost upwards of $10,000, and it is estimated that glycol sales to the airline industry exceed $200 million per year.

Infrared heating systems are also available for aircraft deicing and have found some limited applications.

Helicopter blades present a special problem as it is considered desirable to avoid getting organic or inorganic, even glycol in the blade mechanisms. Various systems are described to de-ice helicopter blades using warm air. These usually involve the use of a sock or other form of cover over the blades through which warm air is circulated. Dry, warm air does not contain a lot of heat unless introduced at very high temperatures; something that is not practiced in most applications.

Thus, there appears to be a need for a less costly method for deicing aircraft and helicopter blades and a faster, more effective method for thawing ground ice and snow, and heating the surface when ice and snow are no longer present.

SUMMARY OF THE INVENTION

The invention seeks to provide a method of deicing, melting and thawing surfaces that includes heating a liquid in a boiler until it becomes vaporized into steam, directing a lesser portion of said steam through a series of enclosed coils in a plenum-type housing; directing a major portion of said steam through a series of nozzles located in said plenum-type housing, introducing and blowing ambient air through said plenum, past said nozzles and said coils; directing moisture-laden ambient air out of said plenum-type housing to a duct and delivery head, thereby melting ice and snow.

The invention also seeks to provide a method of deicing, melting and thawing surfaces that includes the steps of heating an aqueous liquid in a boiler until it becomes vaporized into steam; and directing said steam to a duct and delivery head, thereby melting ice and snow.

In one embodiment, this invention seeks to provide a delivery head for melting snow and ice on aircraft, helicopter blades and roadways, said delivery head comprising a plurality of flexible tubes, said tubes including a plurality of inlet ducts connected to a device producing moisture-laden warm air or steam, said flexible tubes being comprised of an upper air impermeable fabric and a lower air permeable fabric; said tubes being connected to one and other by said impermeable fabric; said impermeable fabric including a plurality of loops or connecting portions adapted to be connected to a support means.

To enable surface contact of said air permeable fabric on the surface to be thawed, including but not necessarily limited to aircraft, helicopter blades and roadways.

This invention also seeks to provide an air mattress type delivery head adapted to be connected to a flexible duct, said duct adapted to provide forced moisture-laden warm air to said mattress; said delivery head including a plurality of apertures on its underside, and a plurality of connecting loops attached to its upper side; said loops being adapted to connect said delivery head to a support structure.

This invention also seeks to provide a support structure for containing, lifting and lowering said series of tubes, and said mattress-type delivery head, said air mattress-type delivery head including a plurality of spring-loaded flexible rods, said rods being connected to said loops, said spring-loaded flexible rods being attached to a holder lifter hook at their midpoint, whereupon when upward pressure is exerted on said hook, said flexible rods bend upwardly and when upward pressure is released, said flexible rods return to a substantially non-bended state.

This invention also provides a delivery head wherein the support structure is adapted to be moved by an overhead boom, said support structure including a box adapted to support a person, said boom being attached to a moving or stationary vehicle.

This invention also seeks to provide a rectangular air/mattress type delivery head; said delivery head including a top, two ends, and two sides comprised of an air impermeable fabric, said top side including an entry aperture adapted to connect to a flexible, warm-moist air duct, said mattress also including an air permeable bottom fabric side, adapted to allow warm, moist air to escape.

The use of warm, moisture-laden air or steam to melt ice or snow on aircraft can be applied to the aircraft fuselage and wings in a number of ways.

A first delivery head can be a plurality of tubes or compartments having an air impermeable fabric upper side and an air permeable underside. In operation this delivery head is laid on top of a portion of the aircraft in direct contact with the ice and snow to be melted.

A second delivery head is comprised of a mattress-type structure having a plurality of apertures on the underside. The structure is designed to create turbulence in the space between the mattress and the surface to be de-iced. The support structure is constructed such that there is no hard surface within a distance of one foot or more of the bottom or any side of the mattress. This type of delivery head, in deicing operation is supported by its connecting loops, slightly above the area of the aircraft surface to be de-iced.

A third concept for the delivery head is to direct a large, flexible duct, adapted to deliver warm moist air or steam, directly on the aircraft surface. Such a duct is fitted with a tapered end to force the air into a high velocity air stream. This type of delivery head can be used with cold air to blow away any loose snow or ice or it can be used with warm, humid air to concentrate heat on a particular area. The tapered end is of a rectangular form resembling the form of delivery heads used in car washers to dry the surface after washing.

The equipment, which is described in this patent application, can be used in a variety of ways. The selected method of use and procedure will depend upon conditions and needs at the time.

For situations of frost or ice distributed relatively uniformly over an aircraft wing, or other surface to be de-iced, it is most effective to use the second type of delivery head. This will provide an effective delivery of heat uniformly over a large area and it yields the best results for clearing a large surface. The amount of heat delivered can be very large without resort to high temperatures. This is also an effective way to heat an aircraft wing in order to provide some "holdover time".

For situations where the objective is to clear pockets of ice or snow adhering to the surface, the use of a stream of hot, moist air directed to the subject area is more appropriate. The warm air will begin to melt the ice or snow, and it will warm the metal to which the ice or snow is bonded. The disintegrating pocket of ice or snow will then become detached from the surface and will be amenable to be blown off the surface by a blast of high velocity air. The third type of delivery head is most appropriate to this operation.

The system described in this patent application has the following capabilities.

It can be used to blow a concentrated high velocity stream of cold air that can be used to blow away loose snow. (For the purpose of blowing away loose snow, the cold air is better than the warm air as it will not cause melting, making the snow heavier and stickier.)

It can be used to blow a concentrated high velocity stream of hot, moist air that can be used to dislodge and/or melt snow or ice that is adhering to the surface.

It can be used with the mattress-type delivery head to heat or de-ice a large surface. This is best suited to situations where frost or ice is distributed in a relatively uniform manner over the surface. It can be used with warm, dry air to dry and heat an aircraft surface to give it some "holdover time".

In practical application it may be desirable to use a combination of the above. A first step might be to use a concentrated, high-velocity stream of cold air to blow away loose snow. With that accomplished, using the same delivery port, the stream of cold air can be switched to a stream of warm, humid air to loosen, melt and blow away larger remaining pockets of adhering ice or snow.

Finally, the mattress-type head would be used to eliminate any snow or frost remaining on other parts of the surface: first using moist air for more rapid melting, and then switching to warm, dry air for a final warming and drying of the surface.

There is no reason why most of the deicing of an aircraft can not be done at the gate. There are no very high temperatures involved, and no residue other than water from the ice melt. The only precaution would be with respect to the use of high-velocity air to blow off snow or ice. If it were deemed that flying pieces of snow could be hazardous to ground personnel, that process could be done in advance, or alternately concentrated streams of warm, moist air could be used at a lower velocity to melt, but not to blow away, larger pieces of ice or snow that adhere to the surface.

For most applications, precise control of the moisture content is not necessary. It is desirable that the mixed air/steam flow be a few degrees below saturation in order to avoid condensation in the ducts.

The rate of thawing that can be achieved by a stream of air is proportional to the amount of heat that is carried by that air stream. This in turn depends in part upon the temperature of the air, but more importantly, it depends upon the water vapor content of the air. Air with a high degree of humidity contains more heat than dry air. This is most apparent in saturated air at higher temperatures. At one end of the spectrum is 100% water vapor, i.e. live steam, (which must be at 212° F. in order to exist at atmospheric pressure). Cooling one pound of live steam, by say approximately 40° F., to convert it into liquid water at approximately 172° F., releases approximately 1000 BTUs of heat.

In order to get approximately 1,000 BTUs of heat from one pound of dry air, one would have to cool it by approximately 4000° F. More realistically, one would have to use approximately 100 times more air, i.e. to cool approximately 100 lbs of air by approximately 40° F.

Lower concentrations of water vapor in air carry lower amounts of energy, but the amounts are still impressive. Air that is saturated at approximately 175° F. may be thought of as half steam and half air. It has half the energy of live steam without being nearly as dangerous to handle. Near the other end of the spectrum, e.g. at approximately 70° F., air that contains no moisture, has an enthalpy, i.e. energy content, of approximately 17 BTUs per pound. Air at the same temperature, which is at 100% relative humidity, has an enthalpy twice as high, i.e. approximately 34 BTUs per pound.

For saturated air, the energy content increases dramatically as temperature is increased. At approximately 150° F., air that contains no moisture has an enthalpy of approximately 36 BTUs per pound, whereas if it is humidified to approximately 100% relative humidity, it will have an enthalpy of 275 BTUs per pound. Thus, at this temperature, by adding moisture, the energy content of the air can be increased by more than seven fold. At approximately 180° F., the increase is more like 15 fold.

Another way to look at it is that water saturated air at approximately 150° F. contains more heat energy than dry air at approximately 1000° F. Saturated air at approximately 180° F. has more heat energy than dry air at approximately 1500° F. Even these comparisons may understate the capacity of moisture-laden air to melt ice or snow.

Since most applications that require rapid deicing do not allow the use of temperatures in the approximately 1000 degree range, deicing using warm, dry air is often unacceptably slow. Such is the case for deicing aircraft.

At the present time, the most widely used method of deicing aircraft is by spraying with hot water/glycol solution. Liquid temperatures in the range of approximately 150° F. to approximately 180° F. are typically used. The length of time required to do the job is of the order of approximately 15 minutes. Deicing using normal warm air at a comparable temperature can take approximately 10 times as long; a length of time that is not acceptable for a loaded aircraft.

Moisture-laden air or steam presents a more plausible option. At approximately 150° F., a stream of saturated air will melt ice seven times more quickly than air that was heated to the same temperature without the addition of moisture. Saturated air at approximately 180° F. has a heat content that is more than 10 times greater than dry air at the same temperature, and its relative capacity to melt ice is in that range.

With a suitable air delivery system, the present invention can attain deicing rates up to ten times greater than warm air alone. This puts it in the same class as glycol, time wise, but at a fraction of the cost and environmental impact. A glycol-based aircraft deicing system has added benefit over an air-based system in that it leaves a residual coating of glycol that can offer some additional short-term residual protection.

In the present invention, the surface of the aircraft wings and fuselage is heated and in this way provides some residual protection.

In one embodiment of the invention, warm dry air is substituted for warm moist air in order to blow-off excess water, dry and warm the surface.

In another embodiment of the present invention, as conceived for aircraft deicing, a 40% to 60% propylene glycol solution is used within the system itself to avoid freezing.

The production of moisture-laden air and its delivery to the surface to be thawed can be achieved in a number of ways. The most practical vehicles for producing moisture-laden air are described herein. These are: (a) hot water spray; (b) hot water wet-coil; (c) water sprayed into high temperature blown air; or (d) steam. Devices to effectively deliver the moisture-laden air will be described as follows:

(a) Hot Water Spray System

Any variety of commercially available water heaters may be used, provided they have adequate capacity. The heater may deliver the hot aqueous liquid directly to the plenum or it may deliver it indirectly through a heat exchanger. It may be fuel fire (natural gas, propane, oil or even wood), or electrical. However, because of the large amounts of energy required, natural gas, propane or oil are the preferred energy sources. An optional hot water coil may be used to provide supplemental heat to the leaving moisture-laden air. This will serve to convert into water vapor, any residual water droplets that may be in the air stream.

In some applications, it is desirable to lower the relative humidity of the moisture-laden air stream, by raising the temperature, in order to avoid condensation in the duct leading to the delivery head and in the delivery head itself. Hot water or water/glycol mix may be used, instead of water, as the source of moisture and the heat transfer medium. When the water/glycol mix is used as spray, the moisture content of the moist air will be lower than when water alone is used. Consequently, the energy content of the air stream will be lower by a few percent if water/glycol is used. The moist air will also contain some glycol vapor.

The ratio of water vapor to glycol vapor in the air stream will be determined by the relative vapor pressures of the two liquids at the given temperature plus some degree of entrainment of glycol by the water vapor. As a rough guide, glycol will constitute about 2% to 5% of the vapor if the liquid is 50% glycol.

The pumping system should be capable of circulating approximately 8 GPM per 100,000 BTU of boiler heating capacity. The circulation pump must also have the capability of achieving this while overcoming the resistance offered by the spray nozzles in the humidification chamber;

(b) Hot Water Wet-coil Method

A blower introduces air into a plenum using a duct in which are situated a series of coils. The actual number of coils (or rows within a coil), will be determined by the application as well as other elements of the design, but in general it will be significantly more than would be used to simply heat the air without the addition of water vapor. A circulating pump circulates water over the face and through the core of each of the coils, keeping their entire surface wet. A reservoir collects water that is in excess of what is required for evaporation. Thereafter, the water can be re-circulated. Water must be added from time to time to the reservoir to compensate for evaporation.

The coils are heated by hot water or hot water/glycol mix supplied by a hot water heater of suitable capacity. The flow rate from the boiler, its capacity, et cetera, must be engineered to take into account the large quantities of heat needed to evaporate the water in addition to that required to heat the air.

(c) Water Sprayed into High Temperature Blown Air Method

A blower forces ambient outside air into the plenum. Proximate the air intake is a flamed heat source which uses fuel, propane, or natural gas. As the ambient air is forced into the plenum by the blower, it is heated upwards to around 800° F. Thereafter, the high temperature heated air passes through a series of fine water droplets emitted by nozzles. If sufficient water is added to saturate the air it will be cooled to approximately 140° F.

Although the temperature of the hot air stream is greatly reduced, its energy content remains essentially the same, much of the available sensible heat having been converted to the latent heat of the water vapor. The warm moisture-laden air then leaves the plenum and is directed through a duct to a delivery head which brings warm moisture-laden air in contact with snow and ice.

(d) Steam Method

The blower and plenum arrangement are essentially similar to that shown for the wet-coil method. In this arrangement, air entering the plenum encounters live steam, introduced from a steam boiler, and then flows through a steam-heated coil. The purpose of the coil is to remove water droplets that form as the steam heats the incoming cold air. The moisture-laden air, free of any water in liquid form, may then be conducted to the delivery head.

While the hot liquid required in method (a) and method (b) would normally be produced as required, directly by a hot water heater, there are circumstances where it is preferable to provide the hot water, or more generally the hot liquid, from a reservoir. Such a circumstance would be where use is intermittent and very large quantities of heat are required for a short period.

Other circumstances may occur where the close proximity to the flames inherent to a gas, propane or oil-fired hot water heater, poses a risk of fire or explosion. In this latter circumstance, the reservoir may be mounted on a truck or trailer so that it may be brought directly to the site where deicing is required. Such might be the case for deicing aircraft or helicopters.

In these configurations, i.e. using fixed or mobile reservoirs, the circulating pump and hoses described under method (a) and method (b) would be associated with the reservoir, and would circulate the liquid through the plenum arrangement and back to the reservoir; the supply and return, from and to the reservoir being constructed according to means, well known in the trade, that minimize mixing between the cooler returning liquid and the hot liquid in the reservoir.

In order to achieve the desired result of efficiently deicing a surface, it is important to get good heat transfer from the air stream to the surface in question. Different applications are best served with a heat delivery head designed to best suit the application.

For deicing aircraft, an air delivery system consists of the perforated mattress described above or porous fabric tubes that can be positioned and moved in very close proximity or in contact with the aircraft fuselage and wings. The objective is to ensure that most of the heat energy in the air stream is transferred to the surface. Because most of the heat energy in moisture-laden air or steam is at high temperatures, it is relatively easier to achieve efficient transfer of heat from a moisture-laden stream or steam to the cold surface than with air that is dry.

When starting with approximately 170° F. air that is at or near saturation, cooling the air stream to approximately 120° F. will capture near 80% of the heat energy initially imparted to that air. This degree of efficiency makes for a relatively efficient system for most deicing applications, and it is quite feasible to achieve objectives in this range in applications where time is not a critical element. Where deicing must be done very rapidly, as in aircraft deicing, an efficiency of the order of 40% is more realistic. This requires cooling of 170° F. saturated air to as little as 155° F. (i.e. only 15 F of cooling).

In designing the heat delivery head, it is important to bear in mind that the turbulence in the air stream contributes to the heat transfer. It should also be borne in mind that cooling the air stream will produce liquid water and greatly reduce its volume. This volume reduction occurs for two reasons: (1) the loss of water vapor as it is condensed on the cold surface; and (2) the reduced volume occupied by cooler air.

As previously mentioned, in one embodiment of the invention, the delivery device consists of an inflated fabric diffuser that has a plurality of tubes with an air impermeable insulated top layer and an air permeable bottom layer to allow the escape of the warm moisture-laden air or steam. The warm air or steam is fed into the fabric diffusers via ducts connected thereto and it is directed to the surface to be deiced by holding the fabric diffuser very near to or touching the surface.

In a second embodiment the mattress-type diffuser with a plurality of holes on the underside acts as the delivery head.

In a third embodiment, diagonally blown high pressure moist air blows snow and ice and will melt sufficiently to detach the ice and snow from the aircraft.

A helicopter blade can be deiced by simply directing the moisture-laden air or steam to its surface using a suitable tube diffuser at the end of the duct conducting the air. For more effective and more rapid deicing, a sleeve or sock over the blade elements may be used. A variety of configurations of such sleeve and cover arrangements are described in the literature. The novelty in the present invention is that moisture-laden air or steam is used, thereby increasing the rate of melting by a factor of five or more over air that is heated to the same temperature but to which moisture has not been added.

If one pound of air is taken at approximately 32° F. and simply heated to approximately 132° F., it will absorb approximately 25 BTU and have an enthalpy of approximately 35 BTU. If it is then cooled and allowed to escape at approximately 72° F., it brings with it approximately 22.5 BTU. The amount of heat that was used for deicing, at a maximum, is approximately 12.5 BTU, i.e. (35-22.5) the efficiency can be no more than approximately 50%.

By comparison, one pound of air heated and saturated with water, to approximately 132° F. will absorb approximately 155 BTU and have an enthalpy of approximately 165 BTU/lb. If this air loses heat and escapes at approximately 72° F., it will bring with it approximately 35 BTU. The difference, 165-35, i.e. approximately 130 BTU that has been used to do the work, i.e. an efficiency of approximately 84%. The difference between dry and moisture-laden air is even more pronounced at higher temperatures. For this reason, air leaks, always problematic in temporary enclosures, are far less important if moisture-laden air is the heating medium.

Further objects and advantages of this invention will be apparent from the following detailed description of the presently preferred embodiments which are illustrated schematically in the accompanying drawings.

DETAILED DESCRIPTION OF THE INVENTION

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
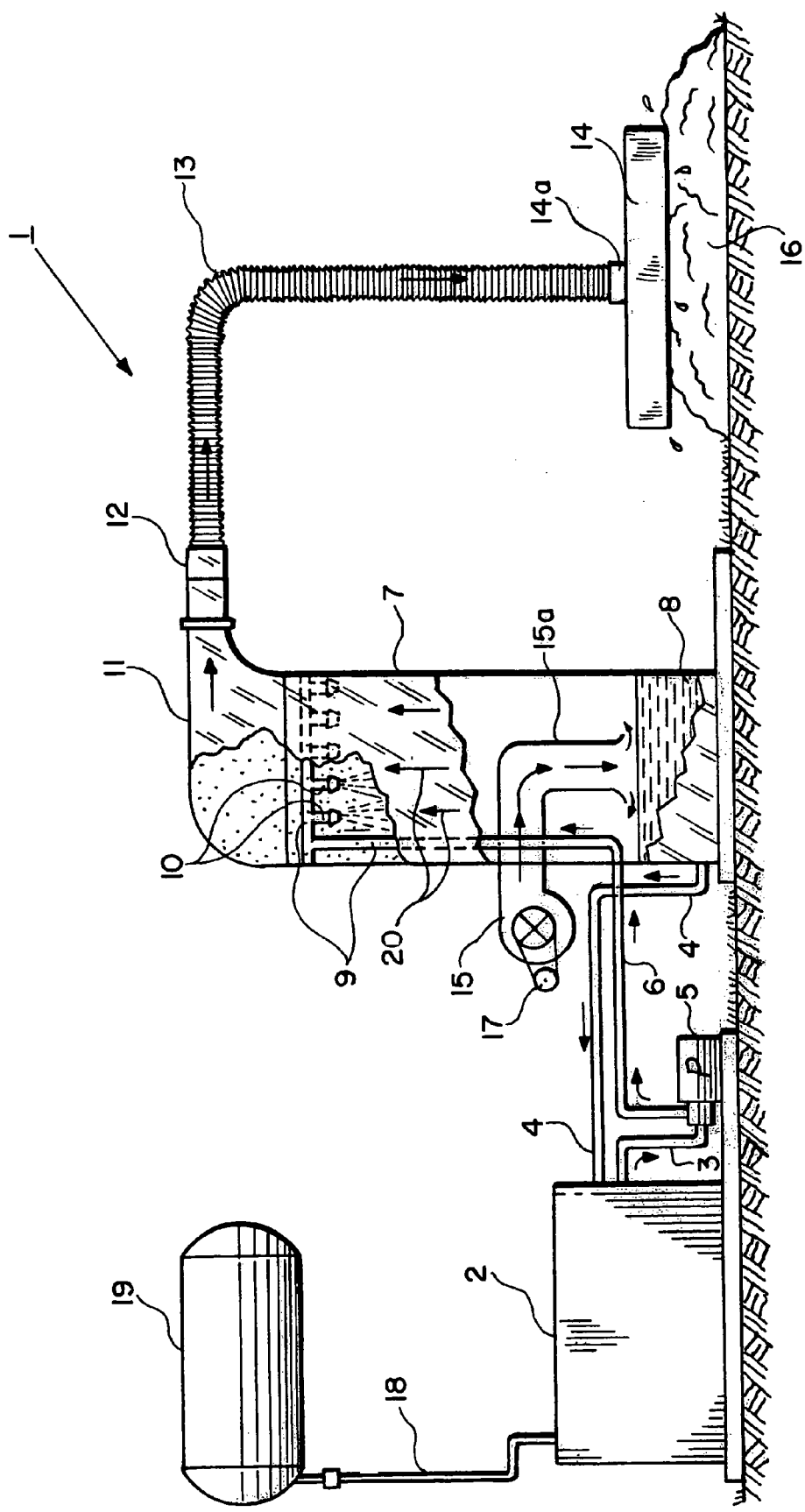
FIG. 1 is a schematic view of a device to produce warm, moisture-laden air and direct it to a delivery head.

FIG. 1 shows a schematic view of an apparatus to produce warm, moist air for the present invention shown generally as 1. Water and glycol or simply water is heated in a boiler shown as 2. Heated liquid leaves the boiler through outlet hose 3 and returns to the boiler through return hose 4.

The heated liquid, preferably around 170° F. to 190° F. is circulated via pump 5. The pump 5 is generally electrical and is well known in the art. The heated liquid, whether it be straight water or a water/glycol mixture, leaves the pump 5 through outlet hose 6 and is directed to the top of a container known as the plenum and marked as 7.

The plenum is approximately four to six feet square and approximately five to seven feet in height. The plenum is preferably water and air proof and contains a catch reservoir 8 at its bottom portion. Hot liquid glycol and water or water is collected in the reservoir 8 and returned through return hose 4 for reheating in boiler 2. The hot water supply hose 6 to the plenum 7 is connected to the tubular member 9, having a plurality of nozzles 10. Nozzles 10 spray heated liquid into the incoming air which is ambient air forced into the plenum by blower 15 powered by an electric motor 17.

The ambient air is forced to the bottom of the plenum by a funnel-shaped structure 15a. The hot liquid from nozzles 10 warms and saturates the incoming ambient air which is forced upward past the nozzles through plenum cap 11 to the warm, moist air is pushed through an insulated flexible duct 13 to a delivery head 14.

The delivery head 14 directs the air over the surface to be thawed in such a manner as to provide direct intimate contact between the moisture-laden air and the surface of the snow or ice or frozen ground 16 to be thawed. The warm, moist air enters the delivery head 14 through an air entrance fixture 14a for flexible duct 13. The warm air, once inside the delivery head 14 exits, directly onto the surface to be thawed thereby losing a good portion of its heat.

Also shown in FIG. 1 and not previously mentioned, is a propane source 19 which enters boiler 2 via propane line 18. In the first embodiment the propane boiler used is of known design and capable of delivering 700,000 BTUs. Finally, the direction of the incoming ambient air is shown generally as 20.

Figure 2:
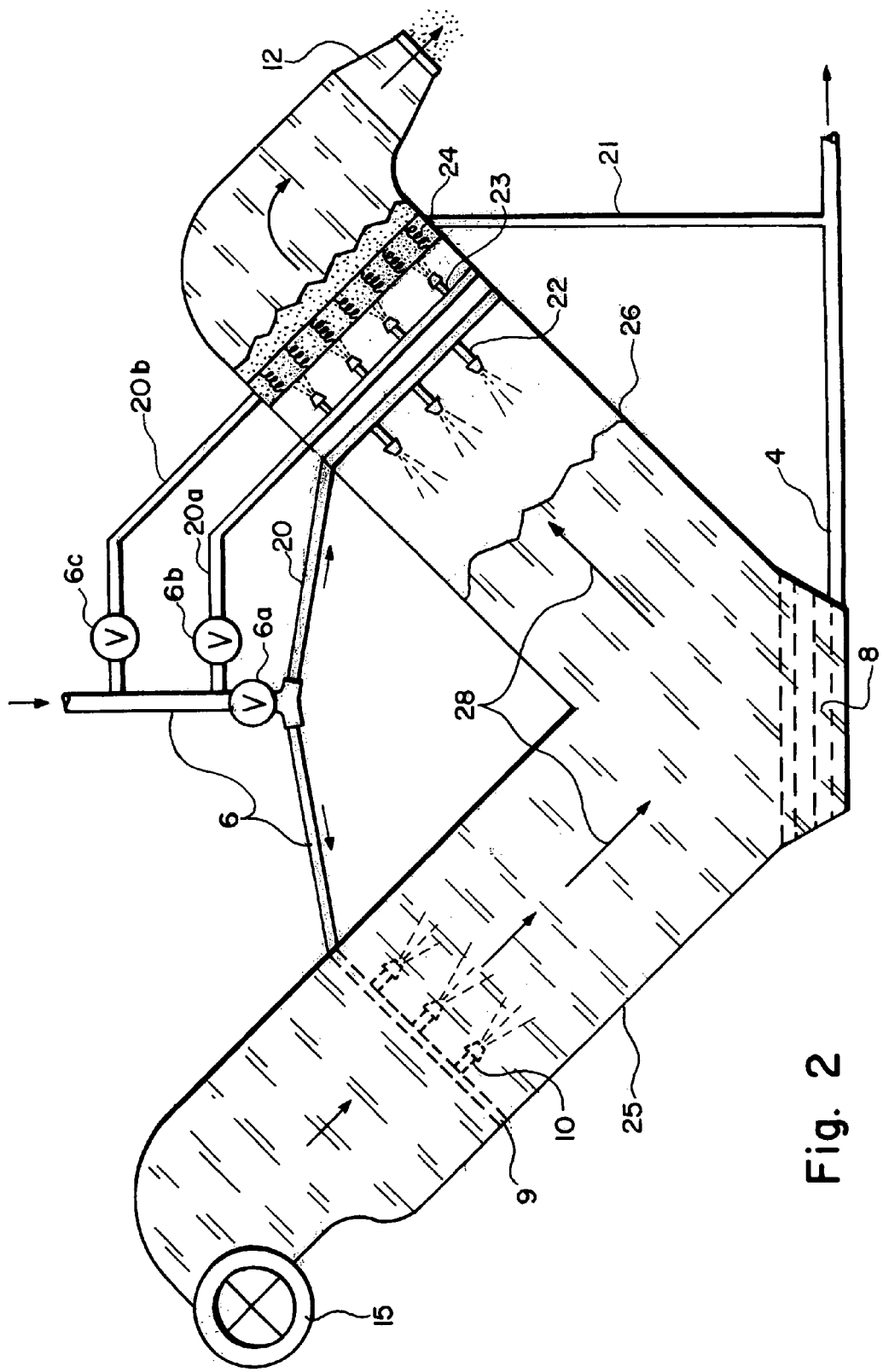
FIG. 2 is a schematic view of a V-shaped plenum.

FIG. 2 illustrates a modified arrangement of the warm, moist air generating device that incorporates additional features not found in the device illustrated in FIG. 1. These are: 1) the use of the wet heated coil method of producing warm humid air as an adjunct to the spray method; 2) the possibility of controlling the degree of saturation of the warm, moist air; 3) the capability of producing warm, dry air.

The plenum, previously marked 7 in FIG. 1, is divided into downward and upward air flow chambers 25 and 26 respectively. The air flow is marked as 28. The hot water or glycol from the boiler supplies pipe 6, and auxiliary pipes 20, 20a and 20b. Thus supply hose 6 runs generally to supply piping 9 and nozzles 10. Auxiliary supply pipes 20, 20a and 20b feed nozzles 22, 23, and coil 24 respectively. Valves 6a, 6b and 6c control the rate of flow through the supply pipes 20, 20a and 20b.

The embodiment in FIG. 2 also includes heat coil 24 which helps to warm the air and in the embodiment shown, it is wetted by nozzles 23, thereby increasing the output of the system while eliminating the excess droplets entrained in the air. Heat coil 24 eliminates all liquid through pipe 21 to return pipe 4. Other excess water or water glycol liquid is collected in a reservoir 8 and returned to the boiler through return pipe 4.

Figure 3:
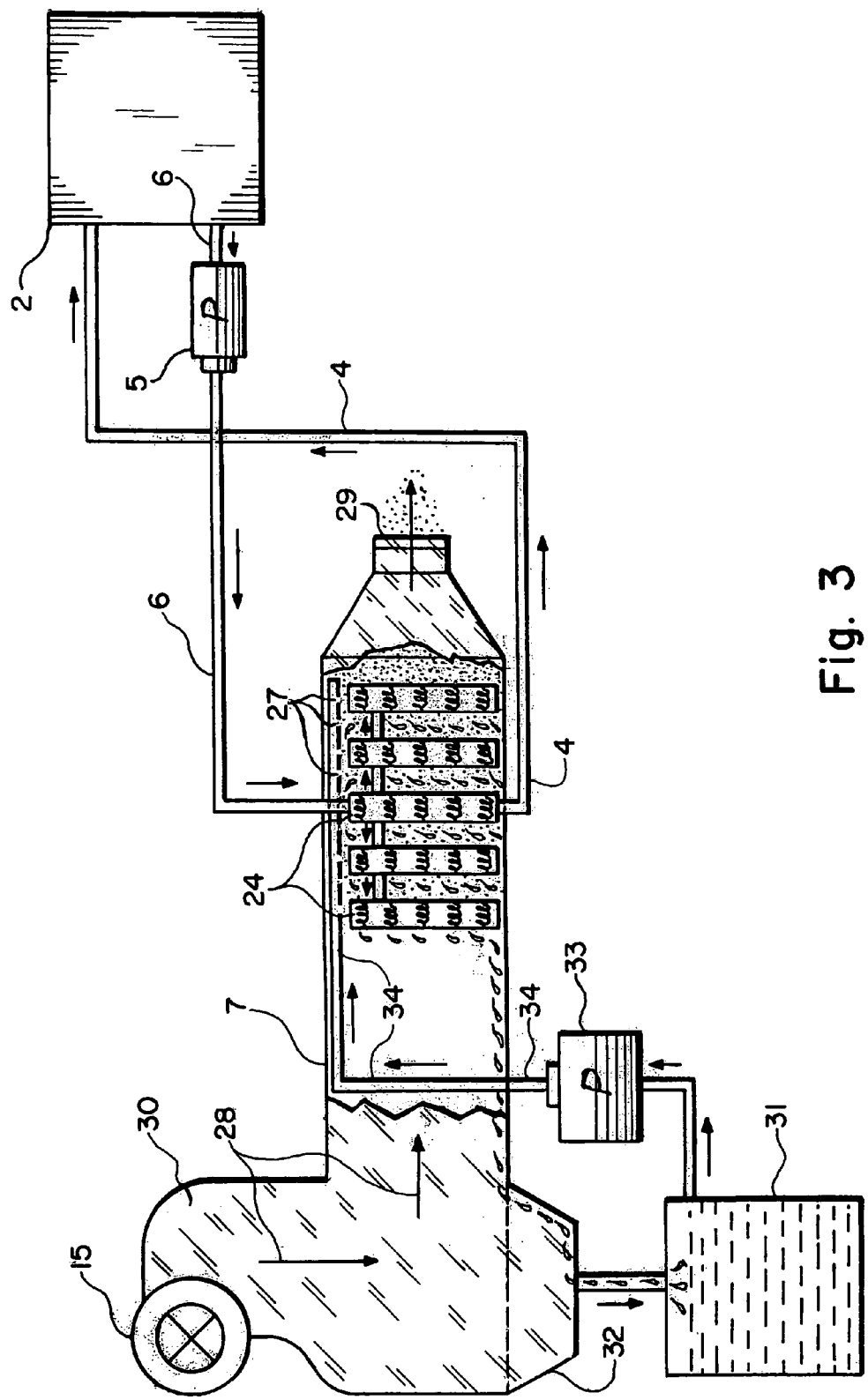
FIG. 3 is a schematic view of a device to produce warm, moist air by blowing ambient air through a series of wetted steam coils.

In FIG. 3, a different heating and moisturizing element is shown. Again, heated liquid, either in the form of water or water/glycol solution, leaves boiler 2, travels through circulation pump 5 and hot liquid supply pipe 6. Hot water supply pipe 6, rather than going to nozzles as shown in previous figures, enters into a series of heating coils 24 and then returns as usual through a return flow pipe 4. The ambient air blown by blower 15 enters through air inlet 30, and follows the path of arrows 28 and exists in a heated, moist condition through nozzle 29.

Meanwhile, water which collects in catch basin 32 drips down to reservoir 31 is circulated upward by pump 33 through inlet pipe 34. Inlet supply pipe 34 is perforated with a number of holes 27. Thus, ordinary water drips down around coils 24 wetting coils such that as the air 28 passes through the series of wetted coils, 24, it becomes moisture-laden and warmed, and thereafter leaves nozzle 29.

Figure 4:
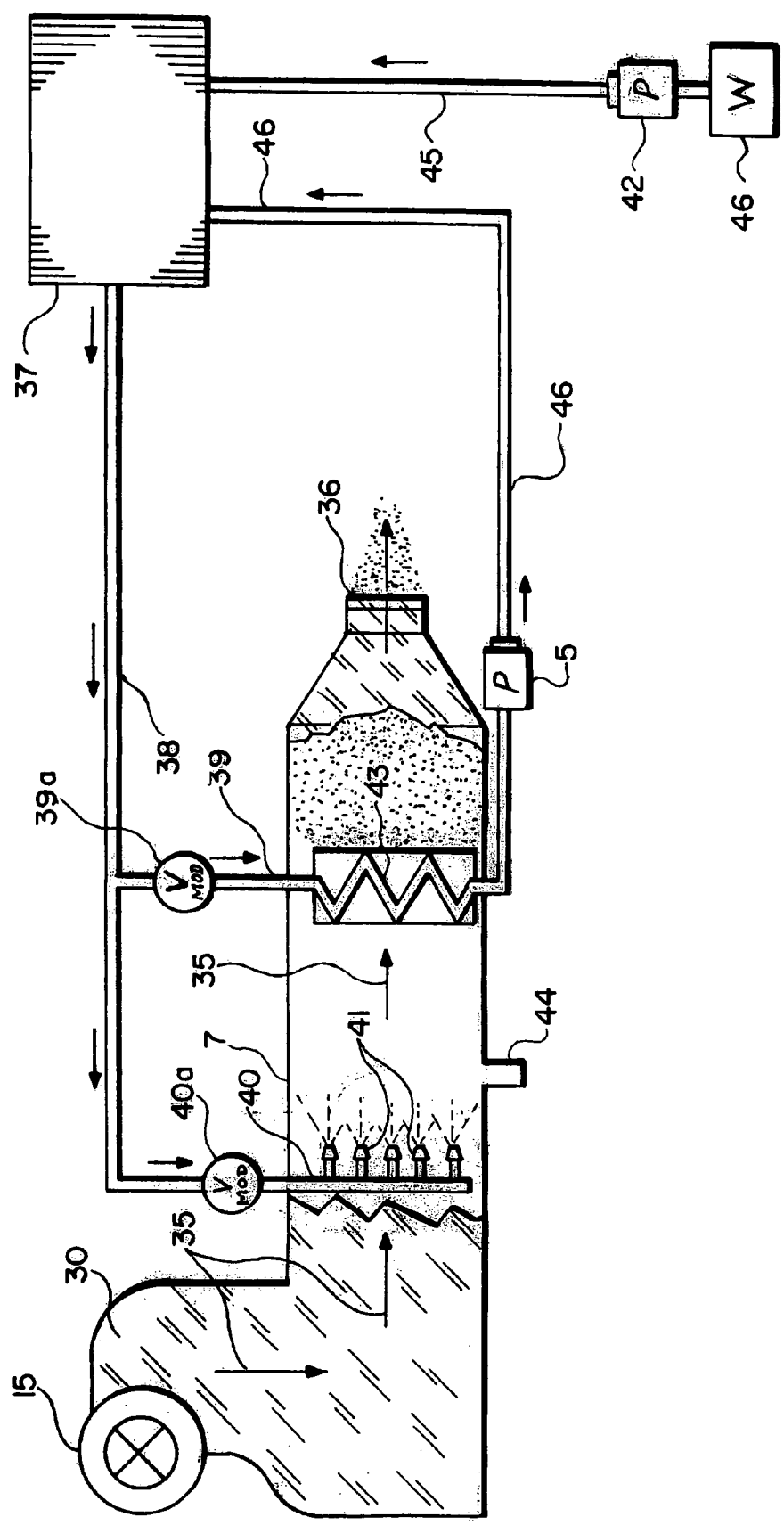
FIG. 4 is a schematic view of a device which uses a steam boiler, steam nozzles and a coil to produce warm, moisture-laden air.

FIG. 4 illustrates a steam-producing element of the invention. Steam boiler 37 produces steam which flows through outgoing line 38. Outgoing line 38 then separates into a first branch line 39 which runs into closed coils 43 and a second branch line 40 which leads steam into steam jet nozzles 41. Modulating valves 47 regulate the steam pressure to steam nozzles 41 and coils 43.

As incoming air flows in the direction of arrows 35, it encounters nozzles 41 and steam coils 43. As the two mix the air will be heated and water vapor will be cooled producing moisture-laden air. The temperature of this moisture-laden air and its composite will depend upon the ratio of air to steam introduced. It exits at 36 as heated moisture-laden air. Any excess water is removed by drain 44. Steam and condensed water from coils 43 exits to boiler 37 by pipe 46 and is moved by pump 5. Fresh water ⓦis fed to boiler 37 via pump 42 through pipe 45.

In another embodiment of the invention, steam can be directed immediately to the delivery head in a steam state.

Figure 5:
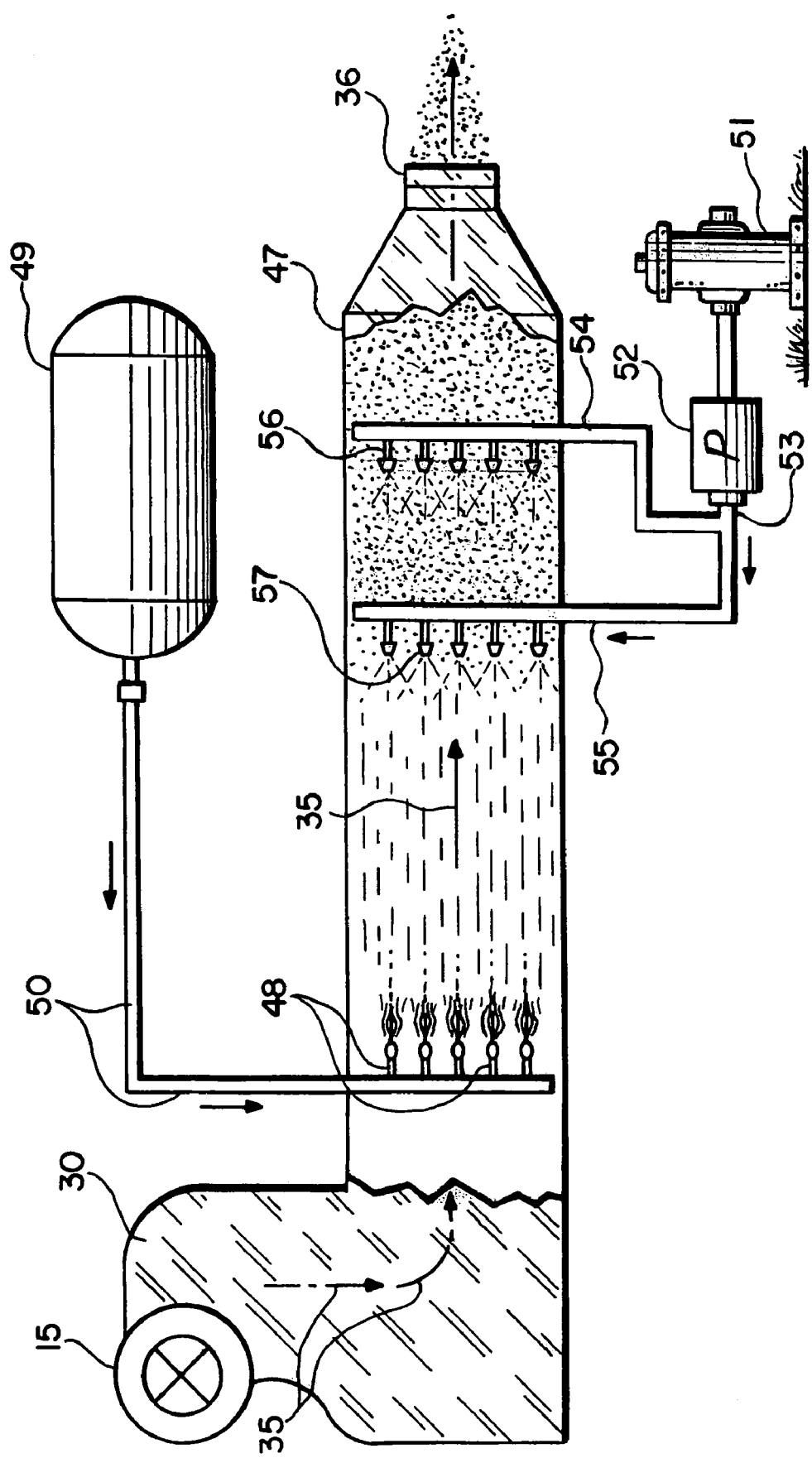
FIG. 5 is a schematic view of a device which uses propane burner jets to produce hot air, which is converted to warm, moisture-laden air by cold water spray nozzles.

FIG. 5 is a schematic view of another heating and moisturizing element for the invention. Blower 15 forces ambient air through a heat-resistant plenum 47. The ambient air moves in the direction of arrows 35. The air first encounters burner jets 48 which are fed by a propane or natural gas source 49 through line 50.

In operation, the flames of jets 48 preferably heat the air up to about 800° F. or more, although the range of temperatures from these burners can be much hotter. The 800° F. refers to a temperature which the inventor believes would be suitable for a number of applications, however the temperature could vary depending upon how much extra air is supplied. Obviously this hot dry air is unacceptable for aircraft deicing operations. A water supply 51 feeds water through pump 52 to water pipe 53, which feeds water to auxiliary lines 54 and 55 and water nozzles 56 and 57 respectively. When the dry air encounters water nozzle spray, it is cooled.

The degree of cooling will depend upon the amount and temperature of the water introduced. If sufficient water is introduced to saturate air originally at 800° F., the air temperature will drop to about 140° F. This warm moisture-laden air then leaves outlet 36 and is directed to a delivery head (not shown in FIG. 5).

Figure 6:
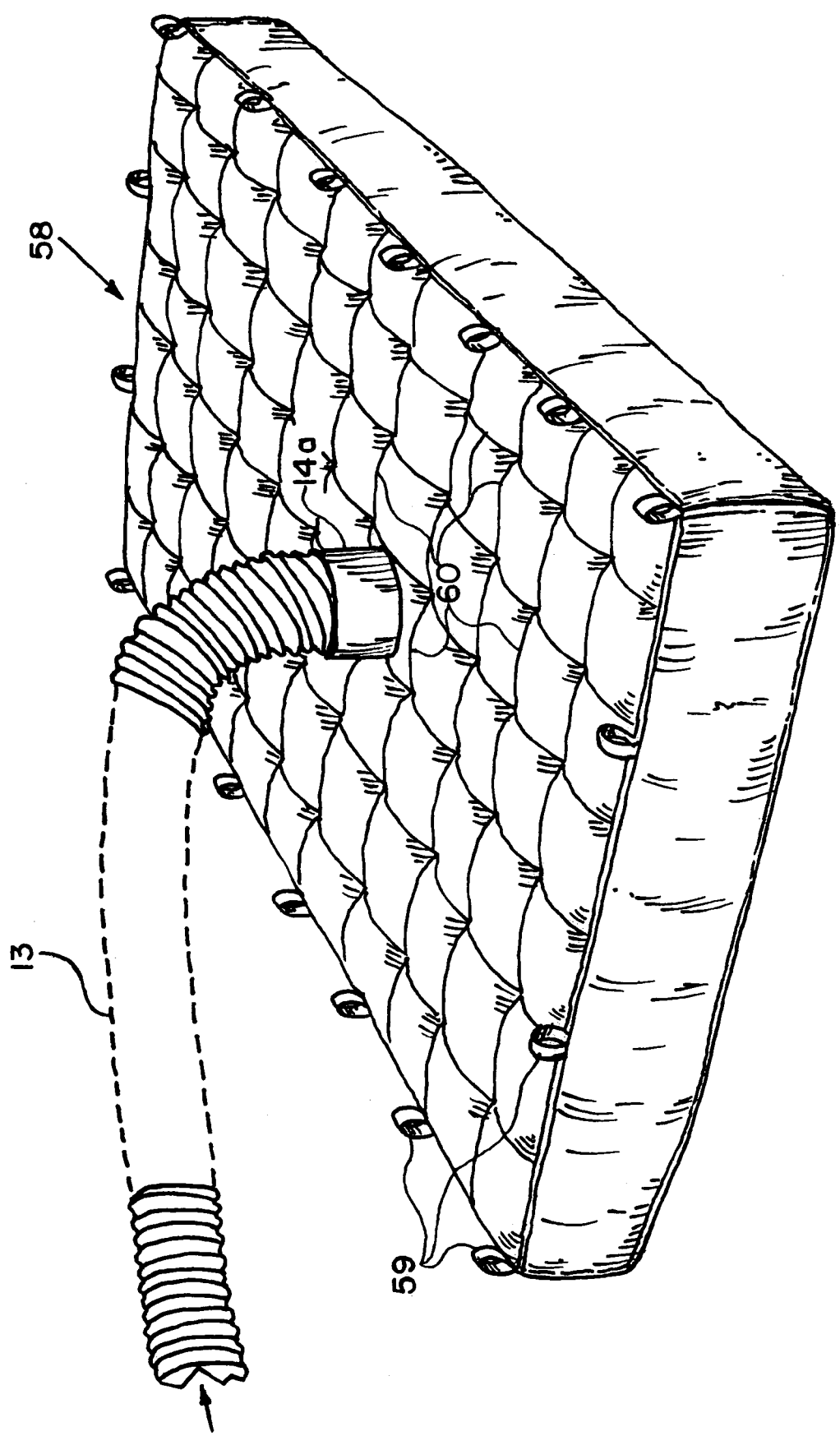
FIG. 6 is a perspective view of a mattress-type delivery device.

FIG. 6 shows a first embodiment of a delivery head 58 for delivering and dispersing warm moisture-laden air to a surface to be melted. The delivery head is in the form of an air mattress. It is connected at entrance fixture 14a to flexible tube 13. The bottom of the mattress has a plurality of holes (not shown in FIG. 6) to allow warm, moist air to escape under pressure above a surface to be melted.

Figure 6A:
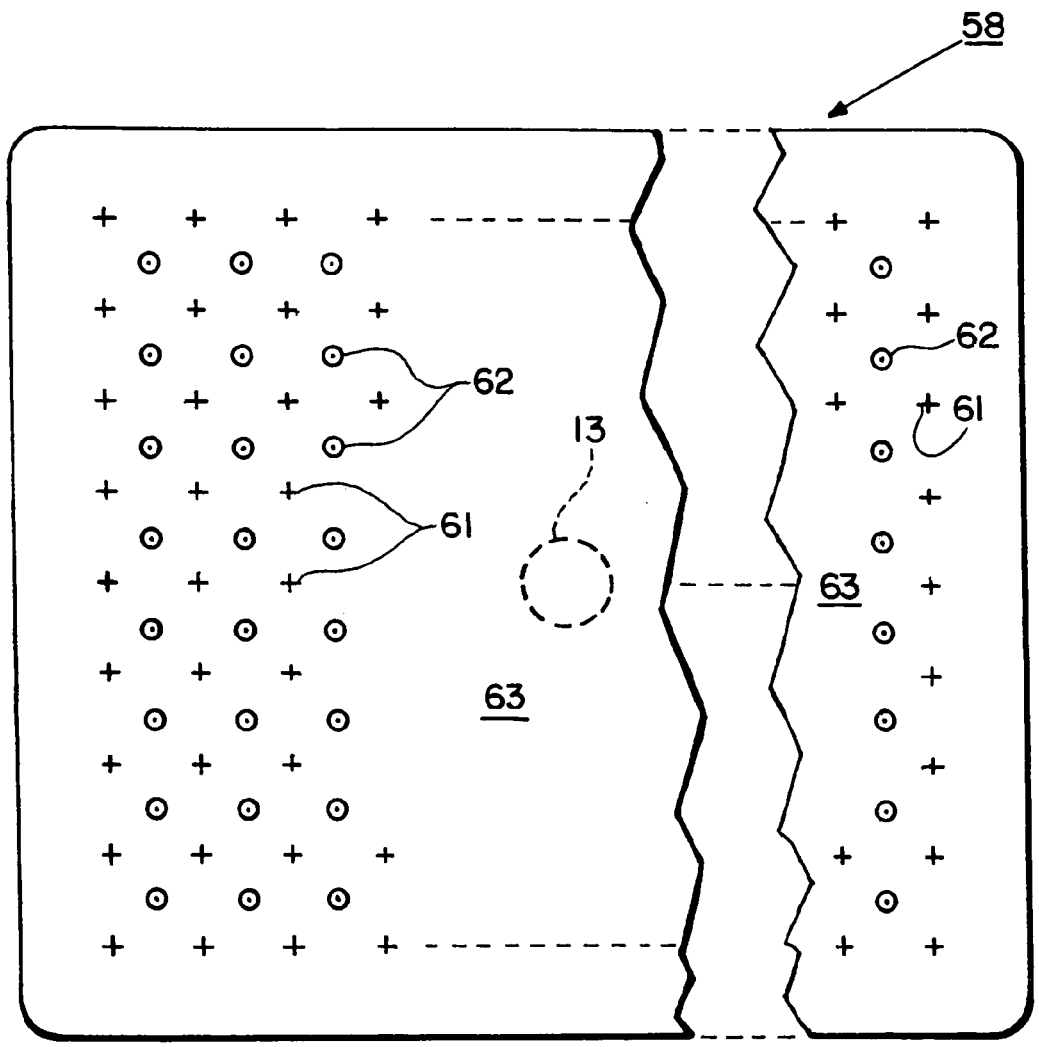
FIGS. 6a and 6b are bottom and cut-away side views respectively of the mattress in FIG. 6.

FIG. 6a is a bottom view of the mattress delivery head 58. Tension buttons 61 secure tension straps 64 (shown in FIG. 6b) to give the mattress its form. The bottom of the mattress 63 has apertures 62 which allow the warm moist air to escape under pressure downwardly.

Figure 6B:
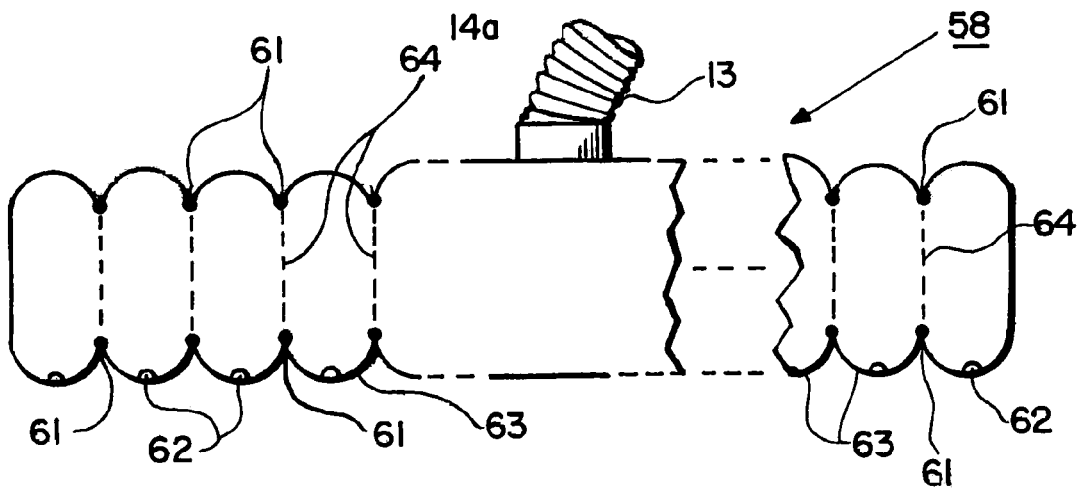

FIG. 6b is a side cut-away view of mattress 58. In dotted lines are tension straps 64 which are secured to buttons 61.

Figure 7:
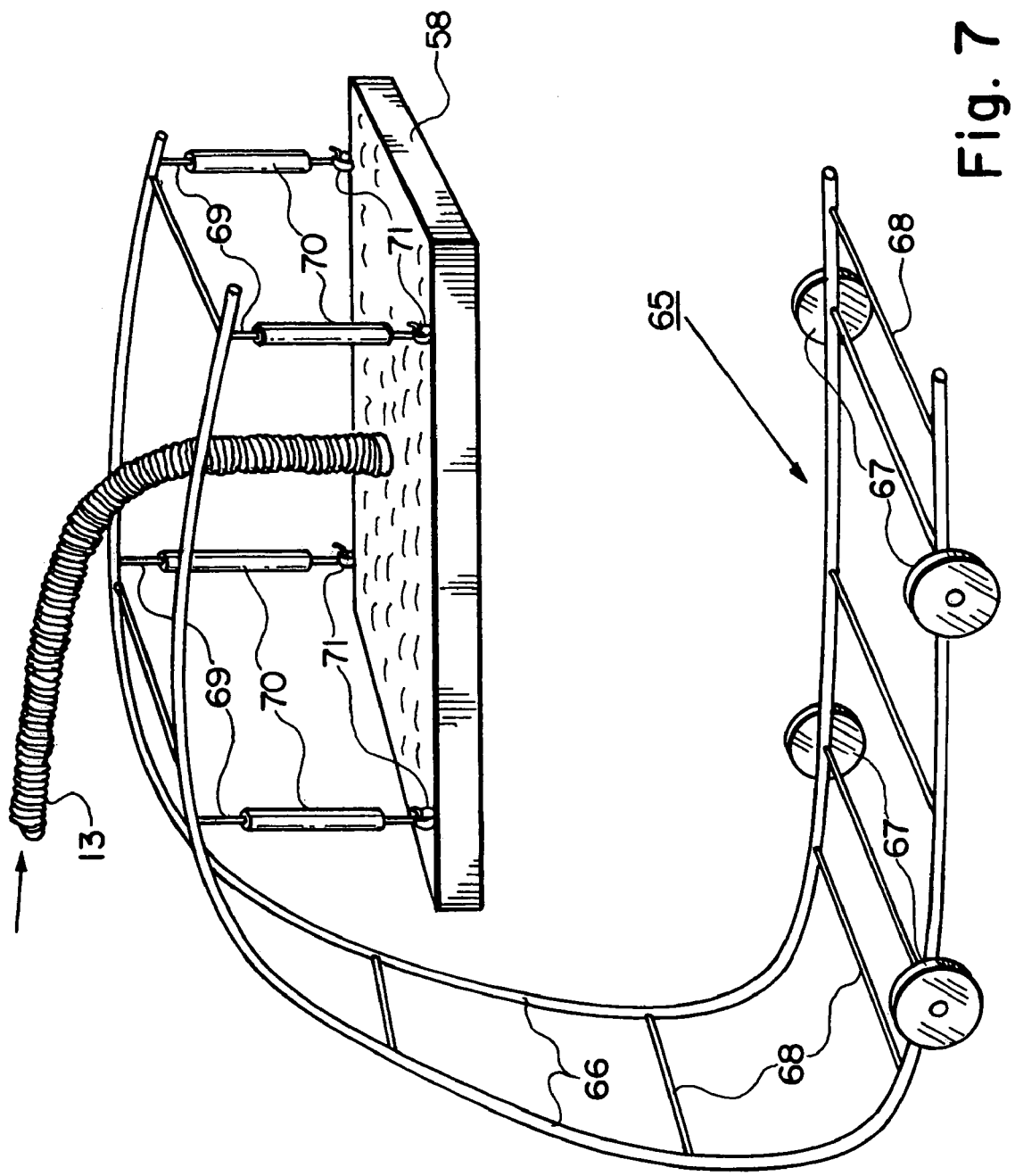
FIG. 7 is a perspective view of a manual lifting device for an air mattress delivery device.

FIG. 7 is a perspective view of a manual mattress support cart 65. The cart can be used to de-ice wings and fuselage of small aircraft. The cart has a frame 66, supported by wheels 67, and cross members 68. At the top of the frame are mattress support members 69 which attach to mattress support loops 71. Hydraulic cylinders 70 move mattress support members 69 up and down to adjust the height of mattress 58 relative to a surface to be melted.

Figure 8:
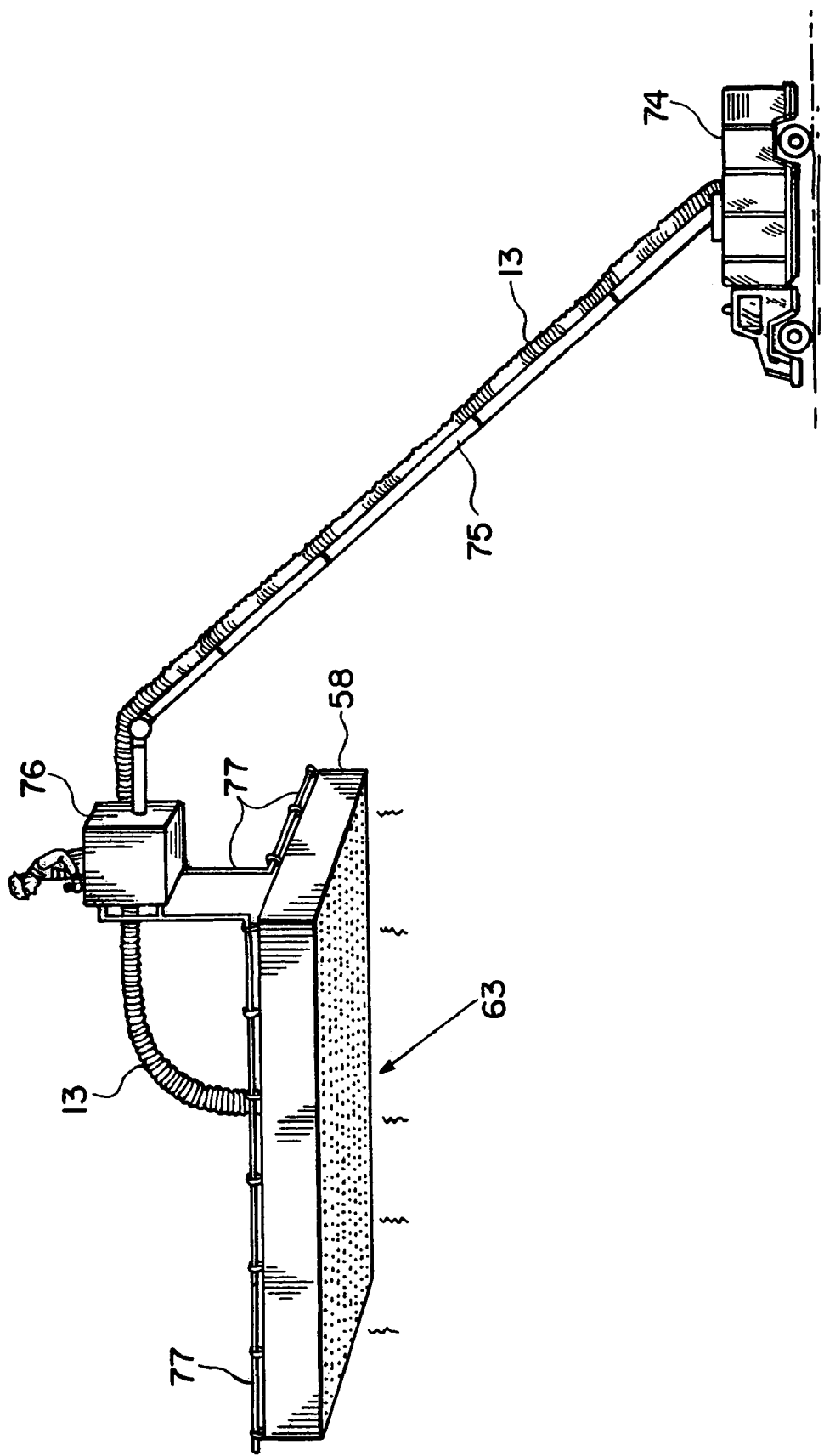
FIG. 8 is a perspective view of an automated lifting device.

FIG. 8 is a perspective view of mattress-type delivery head 58 on a truck mounted system. A truck 74 has an articulated support beam 75 on which is mounted flexible duct 13. At the remote end of the beam 75 is a man box 76 which permits a man to view the deicing operation. Man box 76 is attached to a mattress support frame 77.

Figure 8A:
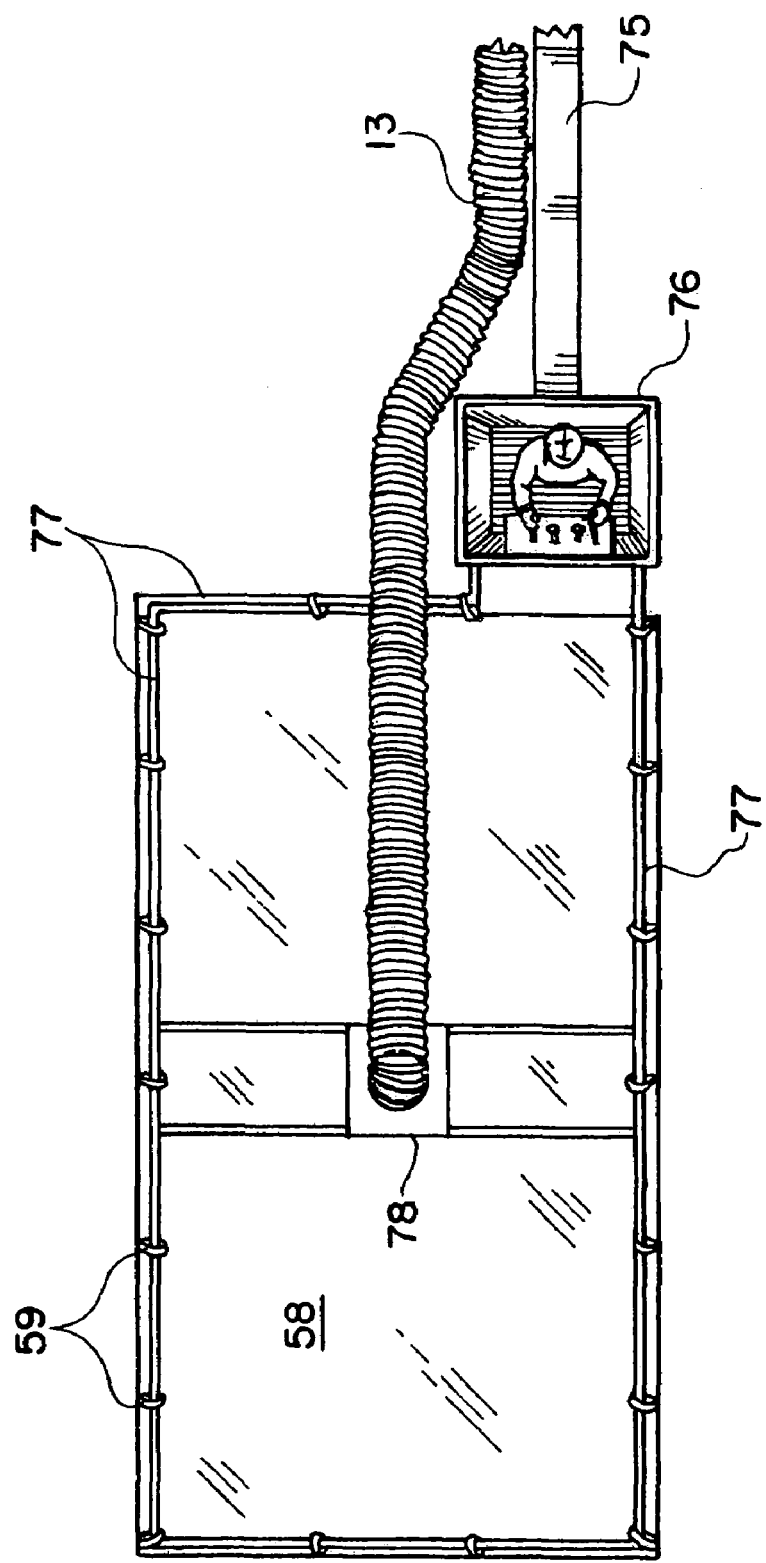
FIG. 8a is a top view of the automated lifting device in FIG. 8.

FIG. 8a is a top view of truck mounted system shown in FIG. 8. A duct mounting plate 78 to receive flexible duct 13 is mounted on mattress support frame 77.

Figure 9:
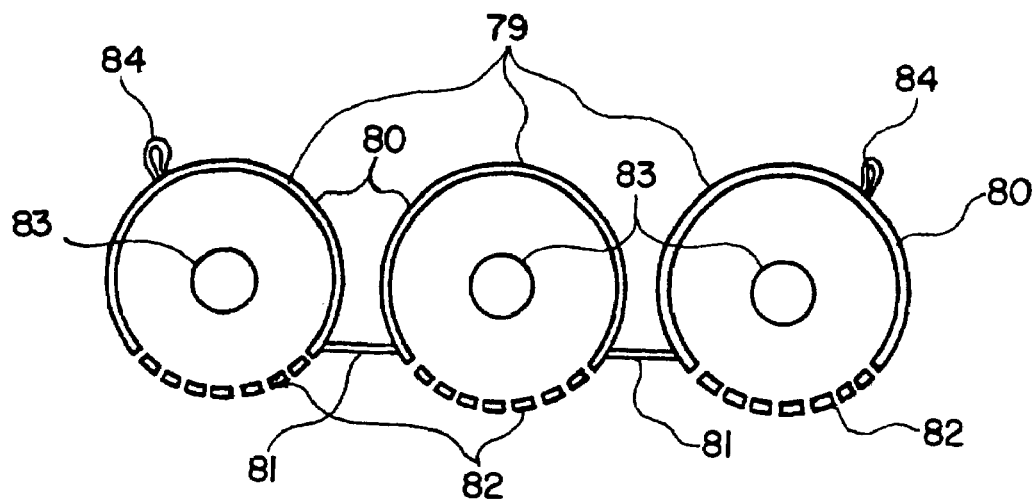
FIGS. 9 and 9a are end and top views respectively of a tube-type delivery device.

FIG. 9 is an end view of a delivery device of the present invention which is designed for melting snow and ice on aircraft, helicopter blades and driveways. The device consists of a number of elongated flexible ducts or tubing 79 which range from 12 to 18 inches in diameter. There is an impermeable top layer of fabric 80 on the top portion of the ducts which prevents the warm moist air or steam to come in contact with the surface to be melted. Tubes 79 are attached to one another by impermeable fabric 81. The bottom of the tubes 79 is an air permeable porous fabric 82 which allows the warm moist air or steam to escape downwards on a surface to be deiced.

Figure 9A:
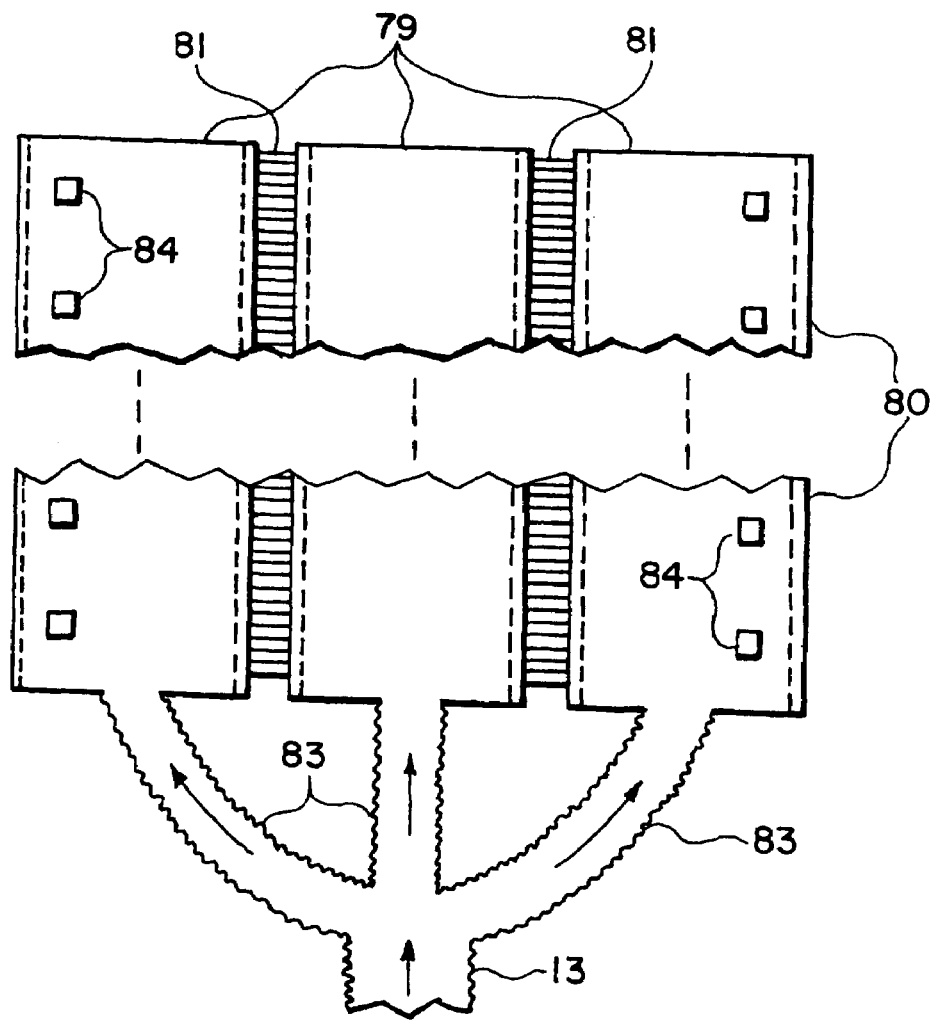

FIG. 9*a* is a top cut-away view of the delivery device in FIG. 9. Warm moist air is fed to the delivery device by duct 13 and auxiliary delivery hoses 83. Holder loops 84 are used to support and spread tubes laterally.

Figure 9B:
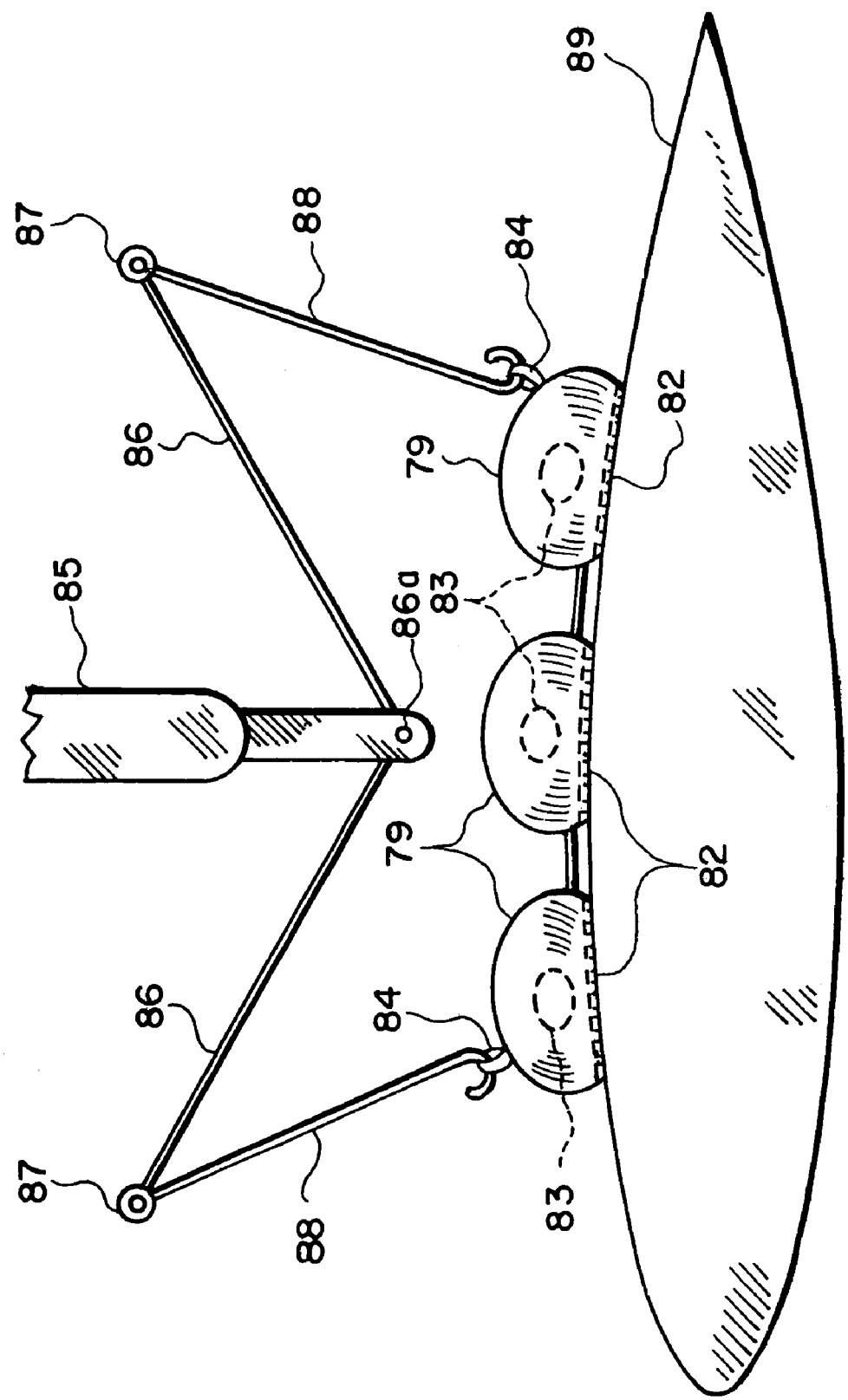
FIG. 9b is a cut-away, side view of a delivery device shown in FIGS. 9 and 9a in operation on an aircraft wing.

FIG. 9*b* is an end view of the upper frames 86 and lower support frames 88 which are connected to tube holder loops 84. Upper frames 86 are pivotally connected to lower frames 88 at pivots 87 and hanger 86*a* attached to support hook 85 holding the fabric delivery device tubes 79 in an extended deicing position on top of wing 89 of an aircraft.

Figure 10:
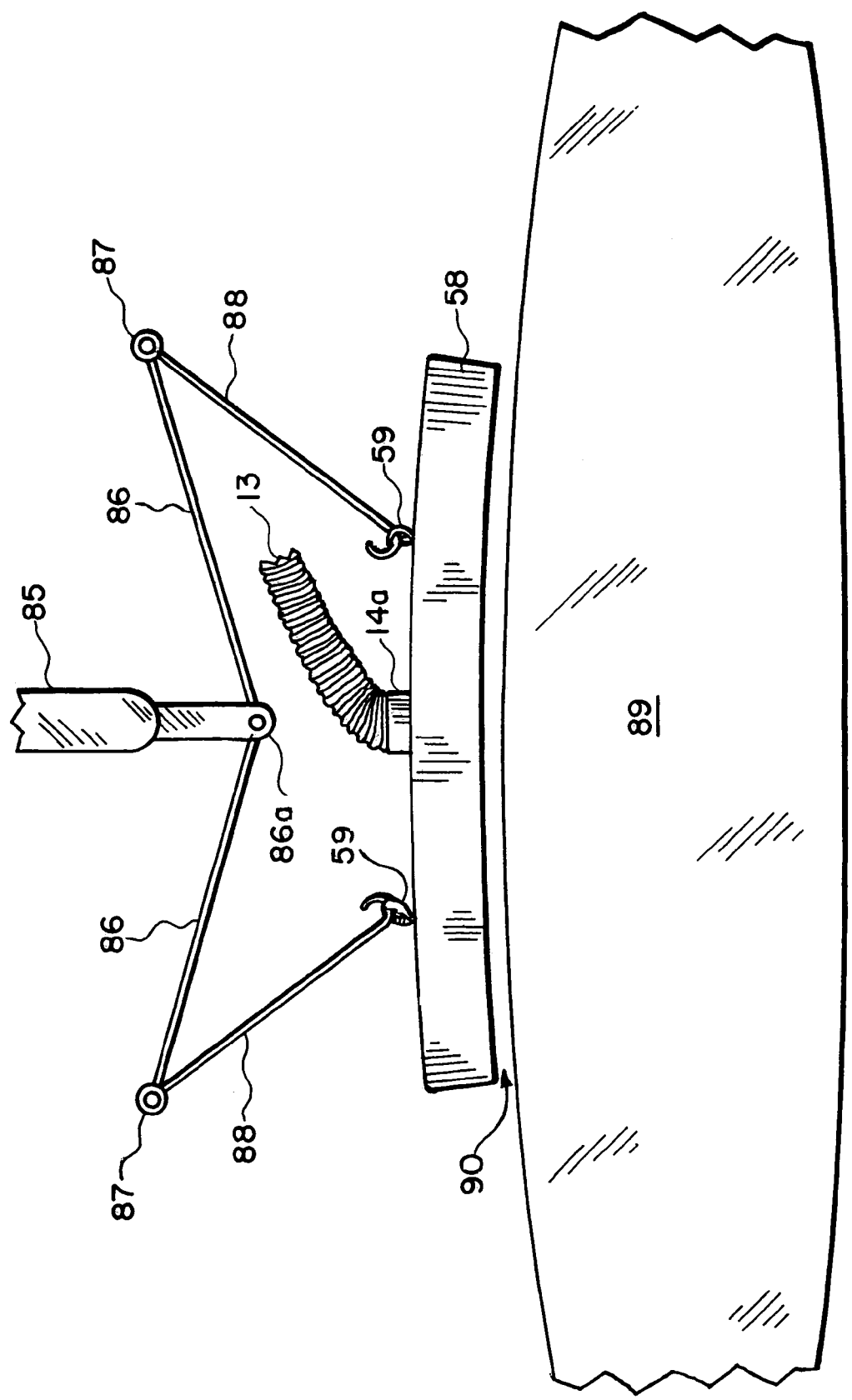
FIG. 10 is a cut-away, side view of a delivery device shown in FIG. 6 in operation above an aircraft wing.

FIG. 10 is a side view of a mattress-type delivery device 58 located in operating position over a wing 89 of an aircraft. It is held in spaced position 90 slightly above the wing 89 by frame members connected to hook 85.

Figure 11:
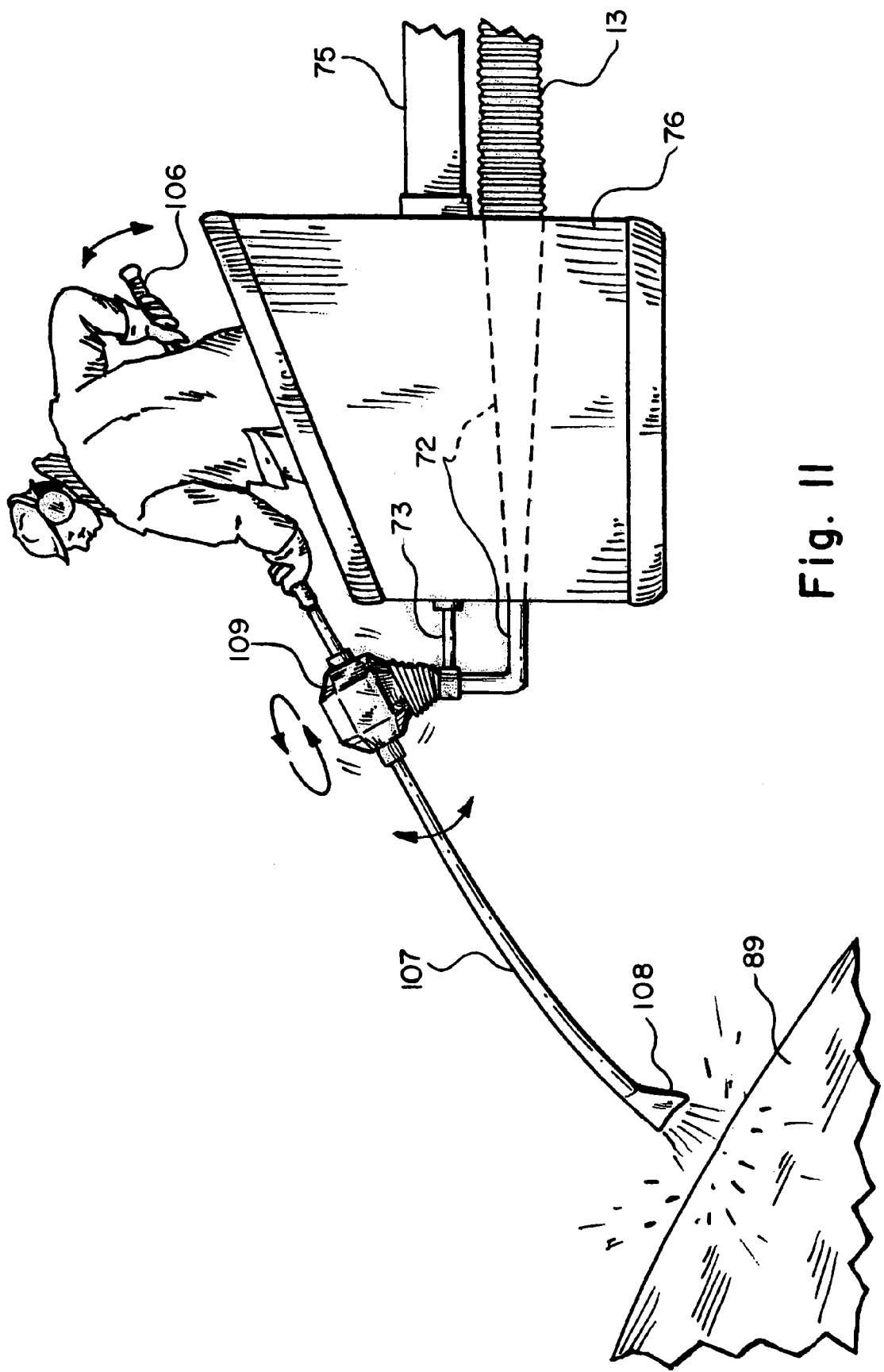
FIG. 11 is a perspective view of an aircraft delivery device using a tapered tube of forced air to remove loose ice and snow from an aircraft wing.

FIG. 11 is a perspective view of an aircraft being deiced using hollow blower shaft 107 to blow ambient air under high pressure to remove loose ice and snow prior to introducing warm moisture-laden air. Duct 13 is connected to a tapered air intake tube 72, which is directed through the security man box 76 and which is supported by bracket 73. Tapered air intake tube 72 communicates with hollow air output shaft 107 (which attaches to an output shaft handle 106) through universal joint coupling 109. Hollow air output shaft has a fanned reduced size output end 108, which disperses blown high velocity air.

Figure 12:
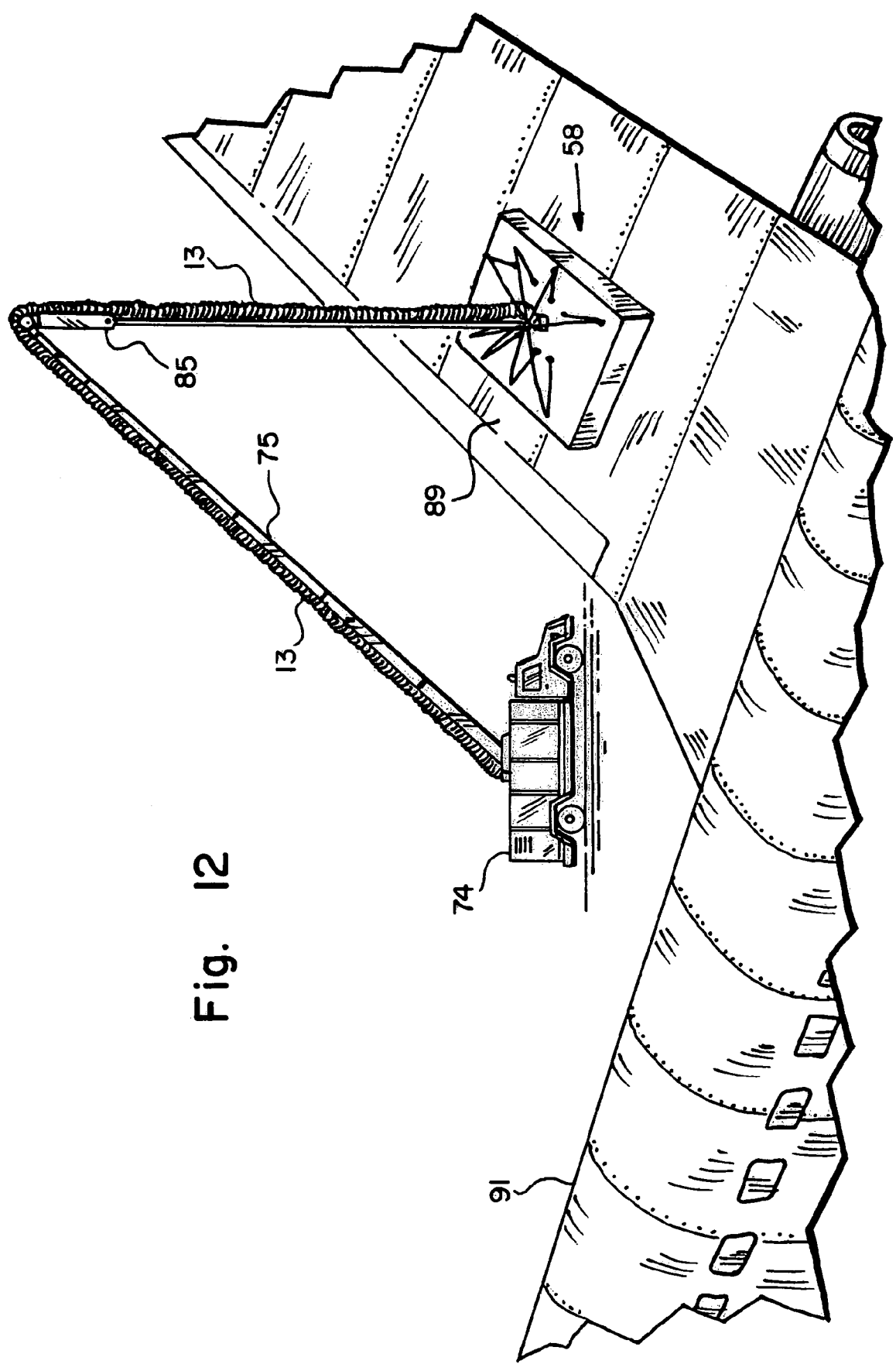
FIG. 12 is a perspective, cut-away view of a delivery device, in an operating position, resting on a wing of an aircraft.

FIG. 12 is a perspective view of an aircraft 91 being deiced by a mattress-type delivery device 58 having an impermeable top surface 80 and an air permeable bottom surface 82. This type of delivery device rests directly on the aircraft for melting ice and snow.

Figure 13:
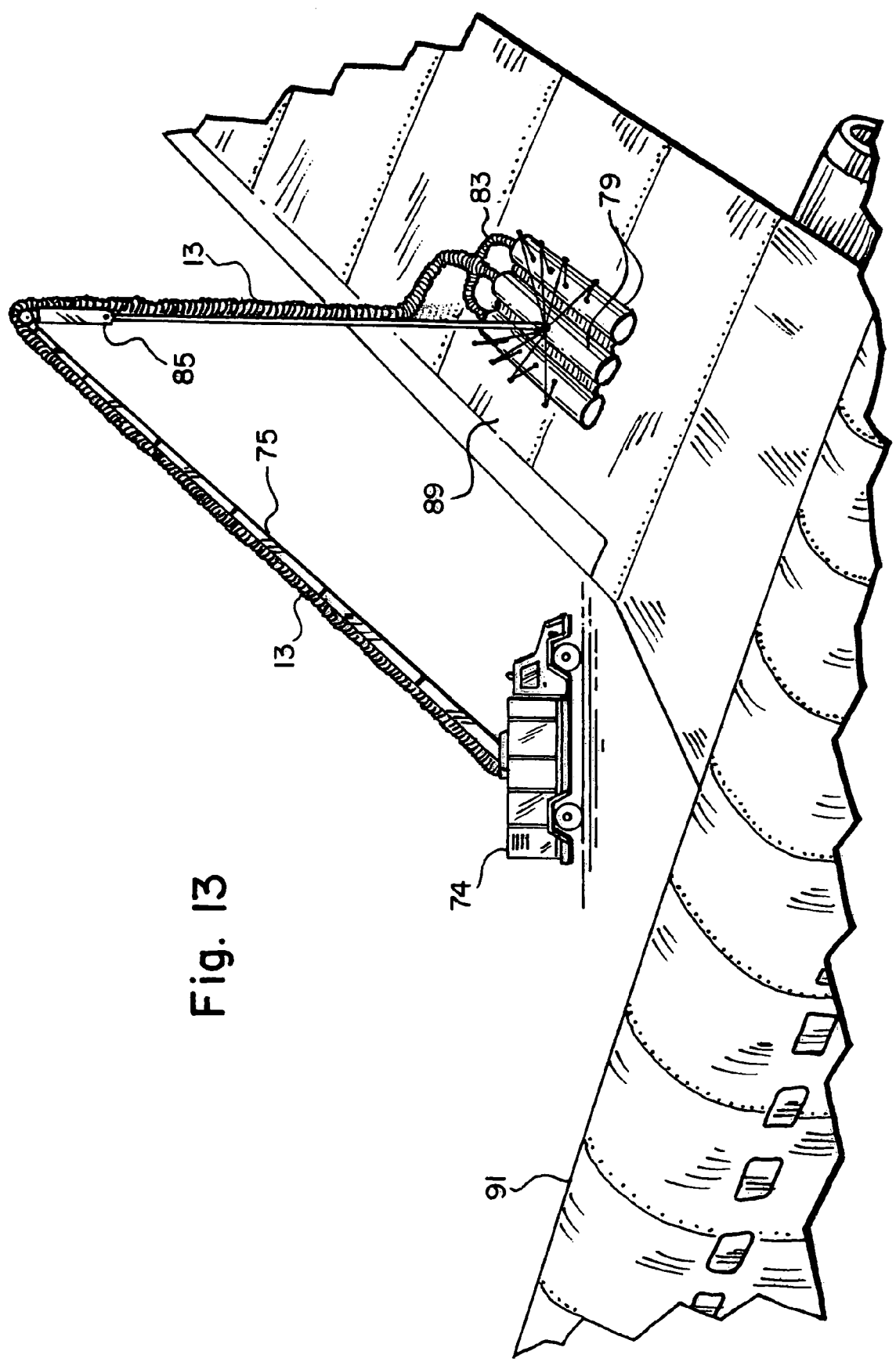
FIG. 13 is a perspective view of a two-type fabric delivery device resting on a wing of an aircraft in operation.

FIG. 13 is a perspective view of the delivery head of the present invention comprising tubes 79 in a downward extended elongated deicing position resting on wing 89 of aircraft 91. Warm moist air or steam flows from truck 74 to duct 13 into the deicing device delivery head.

Figure 14:
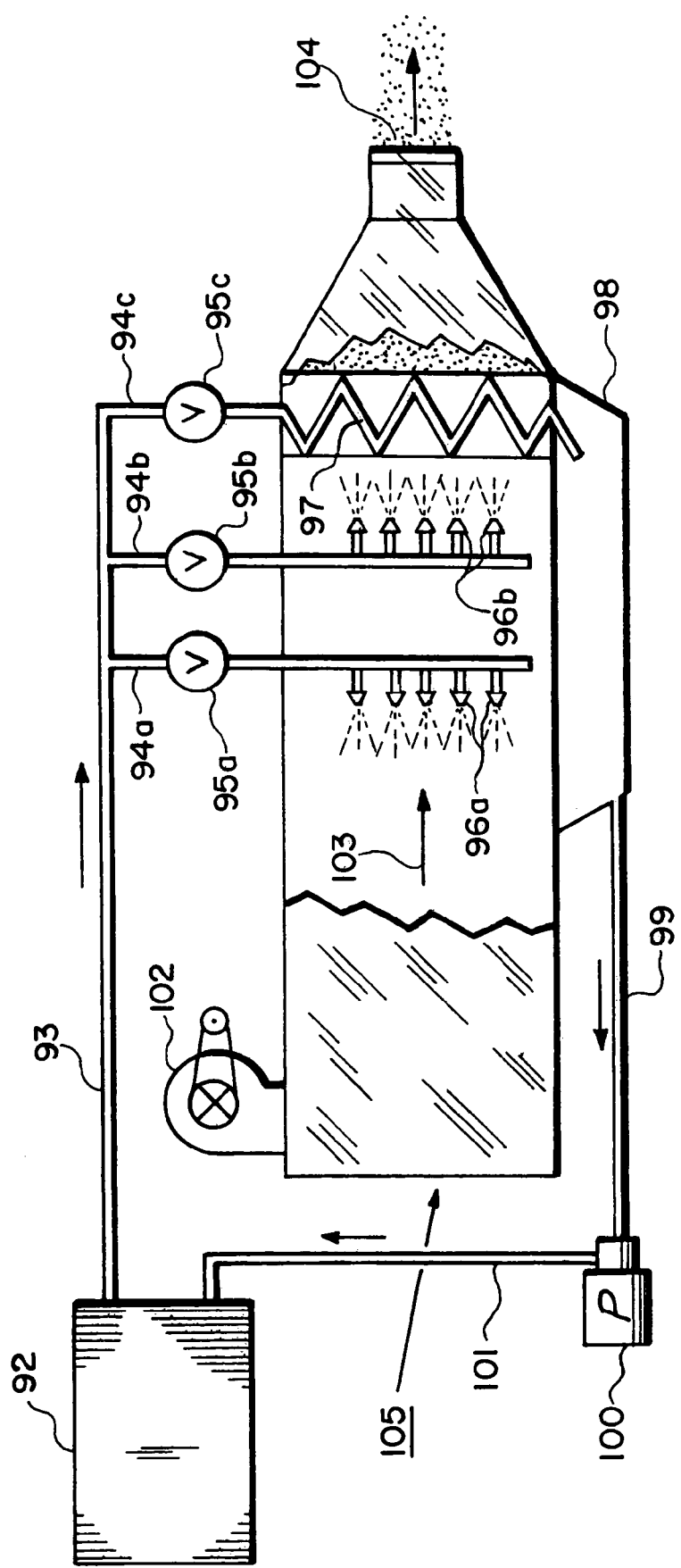
FIG. 14 is a schematic view of a spray-type humid air generator.

FIG. 14 is a schematic view of a spray-type humid air generator. Water is heated in boiler 92 and exits through pipe 93. Hot water is directed to auxiliary water lines 94*a*, 94*b*, and 94*c*. Lines 94*a* and 94*b* feed hot water to spray nozzles 96*a* and 96*b* respectively. Auxiliary hot water line 94*c* directs hot water to heating coils 97. Shut off valves 95*a*, 95*b*, and 95*c* regulate the flow of hot water, to nozzles and coils.

Excess water is collected in reservoir 98, and exits through outlet pipe 99, and is moved by pump 100 through return pipe 101 to boiler 92 to be reheated. Ambient outside air is introduced into plenum 105 by blower 102. The air travels in direction 103 past the nozzles and coils, and exits as warm, moisture-laden air through outlet 104.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A delivery device for de-icing, melting or thawing a surface, the delivery device comprising:
    one or more compartments configured to receive a gaseous heat carrier and disperse the gaseous heat carrier onto the surface, each of the one or more compartments comprising a gas impermeable top member and a gas permeable fabric bottom member;
    one or more inlets operatively coupled with one or more compartments and configured to introduce the gaseous heat carrier into the one or more compartments; and
    a support structure operatively coupled to the one or more compartments.

2. The delivery device as claimed in claim 1, wherein the delivery device is designed to simultaneously disperse the gaseous heat carrier over the surface in proximity to the gas permeable bottom member of the delivery device.

3. The delivery device as claimed in claim 1, further comprising one or more gas impermeable side members.

4. The delivery device as claimed in claim 1, further comprising coupling means for operatively coupling the support structure to the one or more compartments.

5. The delivery device as claimed in claim 1, wherein the gas permeable fabric bottom member comprises a porous fabric to delivery the gaseous heat carrier to the surface.

6. The delivery device as claimed in claim 1, wherein the gas permeable fabric bottom member comprises an impermeable fabric comprising a plurality of apertures to deliver the gaseous heat carrier to the surface.

7. The delivery device as claimed in claims 1, wherein the gas impermeable top member is insulated to help retain the heat of the gaseous heat carrier within the one or more compartments.

8. The delivery device as claimed in claim 1, wherein the compartments are operatively coupled to one another.

9. The delivery device as claimed in claim 8, wherein the operatively coupled compartments are in gaseous communication.

10. The delivery device as claimed in claim 1, wherein the support structure comprises frame members.

11. The delivery device as claimed in claim 1, wherein the support structure comprises spring-loaded flexible rods.

12. The delivery device as claimed in claim 1, wherein the support structure is adapted to be pivotally coupled to one end of a support boom.

13. The delivery device as claimed in claim 12, wherein the support boom further comprises a personnel bucket.

14. The delivery device as claimed in claim 1, wherein the support structure is adapted to be selectively coupled to a mobile cart.

15. The delivery device as claimed in claim 14, wherein the mobile cart comprises mechanical means for up/down, and tilt movements of the delivery device.

16. A method for de-icing, melting or thawing a surface, the method comprising the steps of:
    providing a delivery device comprising one or more compartments, each of the one or more compartments including a gas impermeable top member and a gas permeable fabric bottom member;
    introducing a gaseous heat carrier into one or more of the compartments through one or more inlets operatively coupled to one or more of the compartments; and
    dispersing the gaseous heat carrier onto the surface through the gas permeable bottom member.

17. The delivery device as claimed in claim 1, wherein the gaseous heat carrier comprises warm dry air, warm moisture-laden air or steam.

* * * * *